(12) United States Patent
Claus et al.

(10) Patent No.: US 6,723,021 B2
(45) Date of Patent: Apr. 20, 2004

(54) GEAR ACTUATOR FOR ENGAGING AND/ OR DISENGAGING GEARS OF A TRANSMISSION

(75) Inventors: Thomas Claus, Ulm-Mähringen (DE); Roland Meyer, Roth (DE); Andreas Wild, Unterensingen (DE); Thomas Schmidt, Regensburg (DE); Wolfgang Weigert, Tegernheim (DE); Stephan Pindl, Bad Abbach (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/093,361

(22) Filed: Mar. 7, 2002

(65) Prior Publication Data
US 2002/0173405 A1 Nov. 21, 2002

(30) Foreign Application Priority Data
Mar. 7, 2001 (DE) .......................... 101 10 941

(51) Int. Cl.[7] .......................... F16H 61/40; F16H 61/00; F16H 61/26
(52) U.S. Cl. .......................... 477/68; 477/117; 477/121; 477/127; 74/335; 74/473.11
(58) Field of Search .......................... 477/68, 117, 121, 477/122, 127; 74/335, 340, 473.11, 473.13, 473.3

(56) References Cited

U.S. PATENT DOCUMENTS

| 5,706,712 A | * | 1/1998 | Tischer et al. ............. 91/173 |
| 5,749,264 A | * | 5/1998 | Broadbent ................. 74/335 |
| 6,497,160 B2 | * | 12/2002 | Meyer et al. .............. 74/335 |

FOREIGN PATENT DOCUMENTS

| DE | 199 31 973 | | 1/2001 | |
| EP | 0 947 743 | | 10/1999 | |
| JP | 10141499 A | * | 5/1998 | ........... B60K/20/02 |

* cited by examiner

*Primary Examiner*—Tisha D. Lewis
(74) *Attorney, Agent, or Firm*—Gudrun E. Huckett

(57) ABSTRACT

A gear actuator for engaging and disengaging gears in an automatic manual transmission has a single working piston or two working pistons provided with a first working piston surface and a second working piston surface. An auxiliary piston is provided also. A pressure control valve controls a pressure supplied to the second working piston surface. A shut-off valve is provided. The first working piston surface and the pressure valve are supplied with a system pressure of a hydraulic system. The first working piston surface and the pressure control valve can be decoupled from the system pressure of the hydraulic system by the shut-off valve.

3 Claims, 5 Drawing Sheets

GEAR ACTUATOR FOR ENGAGING AND/OR DISENGAGING GEARS OF A TRANSMISSION

BACKGROUND OF THE INVENTION

1. Field of the Invention

The present invention relates to a gear actuator for engaging/disengaging gears of a transmission, in particular, in AMT systems (automatic manual transmission).

2. Description of the Related Art

In so-called automatic manual transmissions (AMT), the gears of the transmission are engaged by means of an electro-hydraulic actuator. The actuator for a transmission with an "H" shifting pattern is configured of several pistons and corresponding mechanisms in order to carry out a gear shifting movement and/or a gutter movement.

Such a gear actuator is known, for example, from DE 199 31 973 A1. In this connection, a complexly configured unit comprised of actuating devices, sensors, and valve devices is proposed in order to engage and disengage a gear of the transmission.

In FIG. 8 a different known gear actuator 1 as well as a gutter actuator 19 are illustrated. As illustrated in FIG. 8, the actuator comprises two working pistons 3 and 5 as well as two bushings 23 or two auxiliary pistons which are supplied with a controlled system pressure via pressure control valves EVG1 and EVG2, respectively, in order to move a selector shaft 9. The position of the piston elements 3, 5 as well as that of the bushings 23 or the auxiliary pistons is determined by a complex control of the pressure control valves EVG1 and EVG2. Such a gear actuator requires a complex mechanical configuration and has a plurality of components. In order to be able to determine the respective position of the selector shaft 9, a sensor is provided. This results in an increased manufacturing expenditure and a highly branched hydraulic line system for this known gear actuator. Moreover, a complex control must be provided in order to control the valves of the pistons.

SUMMARY OF THE INVENTION

It is therefore an object of the present invention to provide a gear actuator for engaging and disengaging gears in a transmission which enables a safe and reliable engagement and disengagement of gears while providing a simple configuration and easy, inexpensive manufacture.

This object is solved by a gear actuator comprising a first working piston surface, a second working piston surface, an auxiliary piston, and a pressure control valve which controls the pressure for the second working piston surface, wherein the first working piston surface and the pressure valve are supplied with a system pressure, and wherein the first working piston surface and the pressure control valve can be decoupled from the system pressure by a shut-off valve. Advantageous embodiments are the subject matter of the dependent claims.

The gear actuator according to the invention for engaging and disengaging gears in an automatic manual transmission, in particular, in an AMT system, comprises a first working piston surface, a second working piston surface, an auxiliary piston, and a pressure control valve. The pressure control valve controls the pressure for the second working piston surface. The first working piston surface and the pressure control valve are supplied with a system pressure. In this connection, the first working piston surface and the pressure control valve can be decoupled from the system pressure by a shut-off valve. According to the invention, the system pressure is to be understood as a pressure which is provided for operating a hydraulic system. With the design of the gear actuator according to the invention, the actuator can be configured simpler and with fewer components in comparison to the prior art. According to the invention, precisely only one auxiliary piston is required and, moreover, precisely only one pressure control valve is required which controls the process of gear engagement and gear disengagement. The shut-off valve ensures in this connection that, while a gear is engaged, no forces can be transmitted onto the transmission through the gear actuator because the shut-off valve separates the gear actuator from the system pressure. This increases the service life of the transmission. Moreover, by separating the hydraulic connection from the gear actuator, leakage can be minimized so that the service life of the motor and the hydraulic pump can be extended.

According to a preferred embodiment of the invention, the first working piston surface is provided on a first working piston and the second working piston surface is provided on a second working piston. Accordingly, the gear actuator has two working pistons which can be arranged on opposite sides of a selector shaft of the transmission.

According to another preferred configuration of the present invention, the first working piston surface and the second working piston surface are provided on a common working piston. This means that the common working piston is a double-action piston. This further reduces the number of components, and, in particular, the costs and the weight of the gear actuator can be reduced further.

Preferably, the pressure control valve controls the pressure for the auxiliary piston. In this way, the second working piston surface and the auxiliary piston are supplied commonly with controlled system pressure by means of the pressure control valve. In this connection, the second working piston surface and the auxiliary piston are loaded with the same controlled system pressure.

According to a further preferred embodiment of the present invention, the auxiliary piston is supplied via the shut-off valve with system pressure. Accordingly, the first working piston surface and the auxiliary piston are supplied with system pressure. Accordingly, the pressure level at the first working piston surface and at the auxiliary piston corresponds to the pressure level of the system pressure which acts uncontrolled on the components.

In order to determine a neutral position of the selector shaft in the transmission, the auxiliary piston is configured as a stop for the selector shaft. Accordingly, the neutral position, in which no gear is engaged, can be determined in a simple and reliable way. In the neutral position, the transmission can perform a gutter change when a gear is to be shifted which is arranged in a different gutter of the transmission.

Preferably, the first and the second working piston surfaces are differently sized. In this way, the forces which effect the movement of the gear actuator can be adjusted with minimal control expenditure. Particularly preferred in this connection is a configuration wherein the first working piston surface is smaller than the second working piston surface.

According to a further preferred embodiment of the present invention, the pressure control valve controls the pressure level of the system pressure in three ranges. In this connection, in a first range a gear of a gutter of the transmission is engaged, in a second range the neutral position is determined, and in a third range another gear of the same gutter is engaged. This means that, when the first and the second gear are arranged, for example, in one gutter of the transmission, a movement in the direction of the first gear is possible in the first pressure range, and a movement in the direction of the second gear is possible in the third pressure range. In this connection, the system pressure is controlled preferably to 0% to 40% of the system pressure within the first range. In the second range (neutral position), the system pressure is controlled preferably to 41% to 59% of the system pressure; after reaching the neutral position, no movement occurs. In the third range, the system pressure is preferably controlled to 60% to 100% of the system pressure.

Advantageously, the shut-off valve for interrupting the system pressure supply to the gear actuator is configured at the same time as a clutch valve which supplies also a clutch cylinder and a gutter actuator with system pressure. Accordingly, the shut-off valve performs simultaneously also other functions so that the number of components can be further reduced.

According to the invention, in particular, the neutral position of the gear actuator can be determined as a function of the state of the pressure control valve. In this connection, the neutral position can always be determined without employing a sensor. Moreover, the two end positions of the gear actuator can be determined also. However, in order to be able to move in a defined way into intermediate positions of the gear actuator, for example, a synchronization point, a sensor can be preferably provided for determining the position. A slow shifting of the gears is however also possible without sensor because, according to the invention, the neutral position is found always without a sensor. In this way, a gutter selection is also possible when sensor failure occurs.

BRIEF DESCRIPTION OF THE DRAWINGS

In the following, the invention will be described in connection with the drawing with the aid of preferred embodiments. It is shown in.

DESCRIPTION OF PREFERRED EMBODIMENTS

With reference to FIGS. 1 through 5, the first embodiment according to the present invention will be described in the following.

Figure 1:
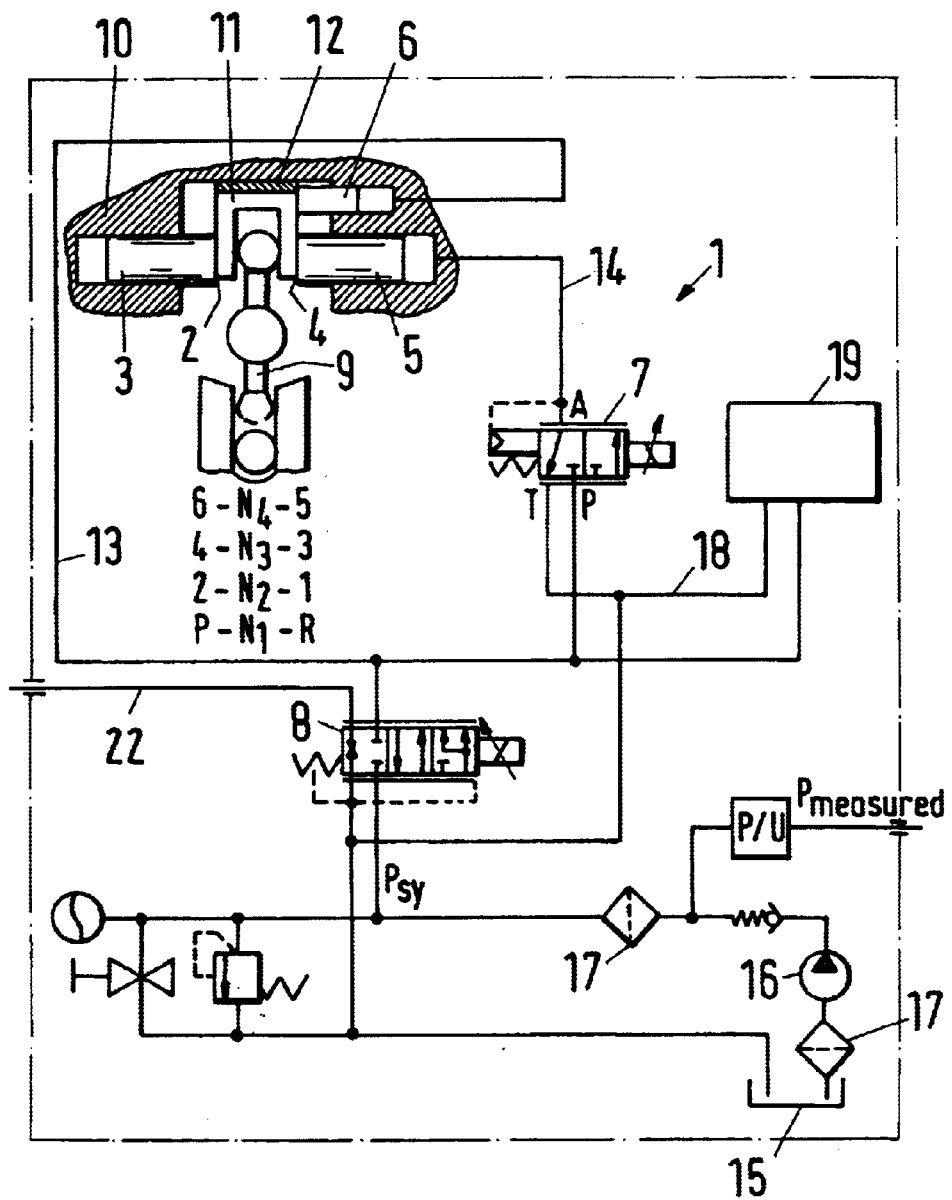
FIG. 1 a schematic hydraulic connection diagram of a gear actuator according to a first embodiment of the present invention.

As illustrated in FIG. 1, the gear actuator 1 according to a first embodiment comprises a first working piston 3, a second working piston 5, an auxiliary piston 6, a pressure control valve 7, and a shut-off valve 8. The first working piston 3 has a first working piston surface 2 and the second working piston 5 has a second working piston surface 4. The surface areas of the two working pistons have different sizes, wherein the working piston surface 2 of the first piston is smaller than the working piston surface 4 of the second piston.

The first piston 3 and the auxiliary piston 6 are connected by a line 13 with the shut-off valve 8 configured as a clutch valve. The second piston 5 is connected by line 14 with the clutch valve. In this connection, a pressure control valve 7 is arranged in the line 14 which controls the pressure supplied to the first piston 5. The clutch valve serves as a shut-off valve which supplies the pistons and the pressure control valve 7 with the system pressure Psy.

The system pressure Psy is provided by a pump 16 which takes in hydraulic liquid from a tank 15. Several filters 17 serve for filtering contaminants from the hydraulic liquid. The clutch valve 19 serves at the same time also for supplying pressure to a clutch cylinder via a line 22 as well as for supplying pressure to a gutter actuator 19 which is supplied via line 18 with system pressure Psy.

As illustrated in FIG. 1, the pistons 3, 5, and 6 act by means of a bracket 11 onto a selector shaft 9. By means of the selector shaft 9, the gears are engaged and disengaged. For this purpose, a selector finger (not illustrated) is provided on the selector shaft 9 for shifting the respective gear within the transmission.

Figure 2:
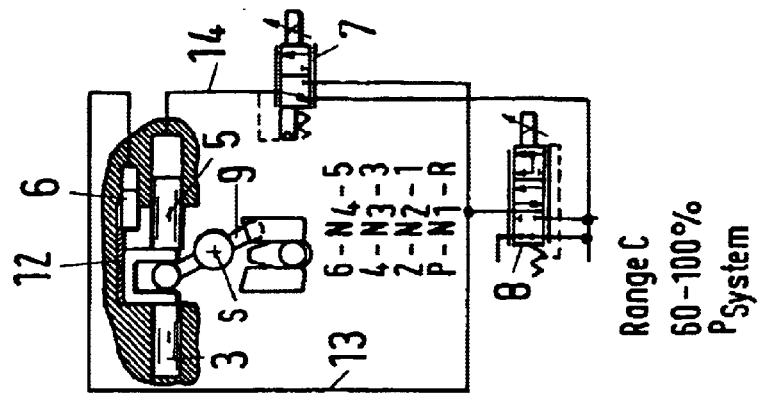
FIG. 2 a schematic view of the gear actuator illustrated in FIG. 1 in a first controlled range.
Figure 3:
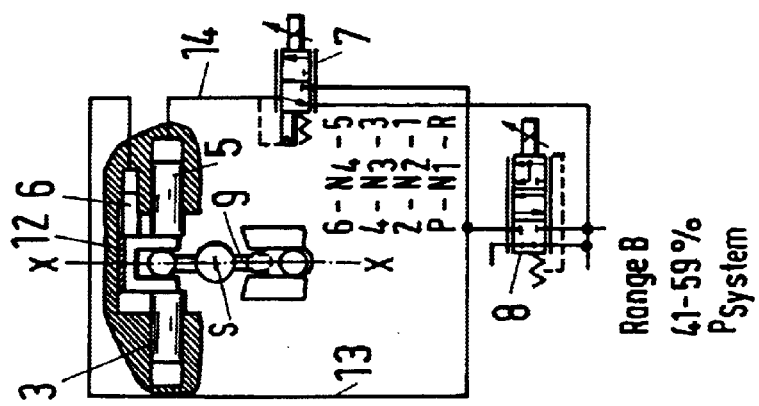
FIG. 3 a schematic view of the gear actuator illustrated in FIG. 1 in a second controlled range.
Figure 4:
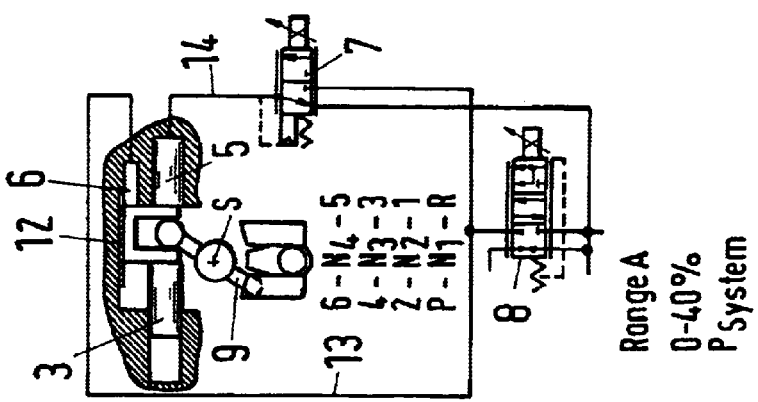
FIG. 4 a schematic view of the gear actuator illustrated in FIG. 1 in a third controlled range.

In FIGS. 2 to 4, the three possible positions of the selector shaft 9 as a function of the different control ranges A, B, and C of the pressure control valve 7 are illustrated.

In FIG. 2, a right position of the selector shaft 9 is shown in which the selector shaft is positioned when the pressure control valve 7 controls the system pressure Psy in the first range A of 0% to 40% of the system pressure. In this connection, the force applied by means of the first piston 3 onto the selector shaft 9 from the left side is greater than the sum of the force applied by the auxiliary piston 6 and the second piston 5 from the right side. Accordingly, the selector shaft 9 moves to the right. As illustrated in FIG. 2, the selector shaft 9 swivels about the swivel point S so that one of the gears arranged to the left in a shifting gutter is engaged. In the FIGS. 2 to 4, four shifting gutters N1, N2, N3, and N4 are provided which are located in planes parallel to the plane of illustration, respectively. More precisely, the reverse gear R and the parking position P are located in the first gutter N1, the first gear 1 and the second gear 2 are located in the second gutter N2, the third gear 3 and the fourth gear 4 are located within the third gutter N3, and the fifth gear 5 as well as the sixth gear 6 are positioned in the fourth gutter N3. The positions of the engaged gears are to the right and to the left of the axis of the selector shaft 9, respectively. This means that, when the selector shaft 9 is positioned, for example, in the gutter N2, the second gear 2 is engaged in the range A of the pressure control valve 7.

FIG. 3 shows the position of the selector shaft 9 in a second control range B of the pressure control valve 7. The second control range B encompasses in this connection a pressure range of 41% to 59% of the system pressure Psy. In this connection, the selector shaft 9 is in a neutral position on an axis X—X. In this neutral position of the selector shaft 9, for example, a gutter change can be performed in the transmission. In order to safely define the neutral position, a stop 12 is provided which serves as a stop for the auxiliary piston 6. In the range B of the pressure control valve 7, the auxiliary piston 6 thus always rests against the stop 12. At the same time, the auxiliary piston 6 provides a stop for the selector shaft 9 so that the selector shaft in the second range is always reliably positioned within the neutral position.

In FIG. 4, the position of the selector shaft 9 in a third control range C of the pressure control valve 7 is illustrated. In this connection, the third control range C encompasses a pressure range of 60% to 100% of the system pressure Psy. As illustrated in FIG. 4, the selector shaft is pushed to the left in the third range C so that it swivels again about the swivel point S. Accordingly, a gear is again engaged within a gutter of the transmission. As illustrated in FIG. 4, a gear on the right side of the gutter is engaged. When the selector finger of the gutter is, for example, positioned in the second gutter N2, in the third control range C the first gear 1 is thus engaged.

Figure 5:
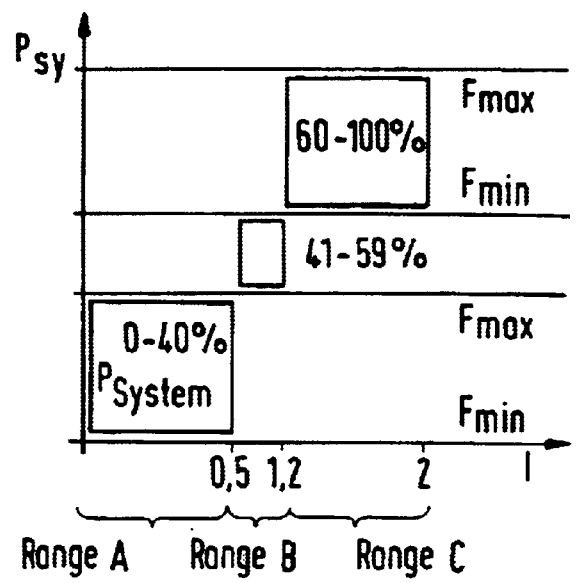
FIG. 5 a schematic diagram illustrating the pressure, controlled by the pressure control valve, as a function of the strength of the current.

In FIG. 5, the three control ranges A, B, C of the pressure control valve 7 are illustrated for clarification, wherein the control ranges are reached as a function of the control of the strength of the current I of the control valve. By means of the pressure control of the system pressure for the second piston 5, the equilibrium of forces present at the selector shaft 9 is thus affected so that the selector shaft 9 is in a desired position, respectively. When, for example, the first working piston surface 2 relative to the second working piston surface 4 has a ratio of 1 to 2, an equilibrium of forces occurs for half the pressure on the piston side controlled by the pressure control valve 7 so that the selector shaft is in the neutral position. In this connection, the auxiliary piston 6 rests against of the stop 12 so that the forces exerted by it cannot result in a movement of the selector shaft.

According to the invention, the gear actuator can thus be actuated by employing a single pressure control valve 7. The clutch valve 8 ensures in this connection only that the gear actuator for an engaged clutch is separated from the system pressure Psy so that it is ensured that no forces of the gear actuator can act onto the transmission while driving with engaged clutch. In this way, the service life of the transmission can be extended. Moreover, additional leakage is prevented. The gear actuator according to the invention has a simple mechanical configuration and requires fewer components in comparison to the prior art so that a reduced manufacturing expenditure, a reduced weight, and an improved reliability can be achieved. Moreover, savings result with regard to electronic components, the wiring harness, and the control because only one pressure control valve must be controlled.

Figure 6:
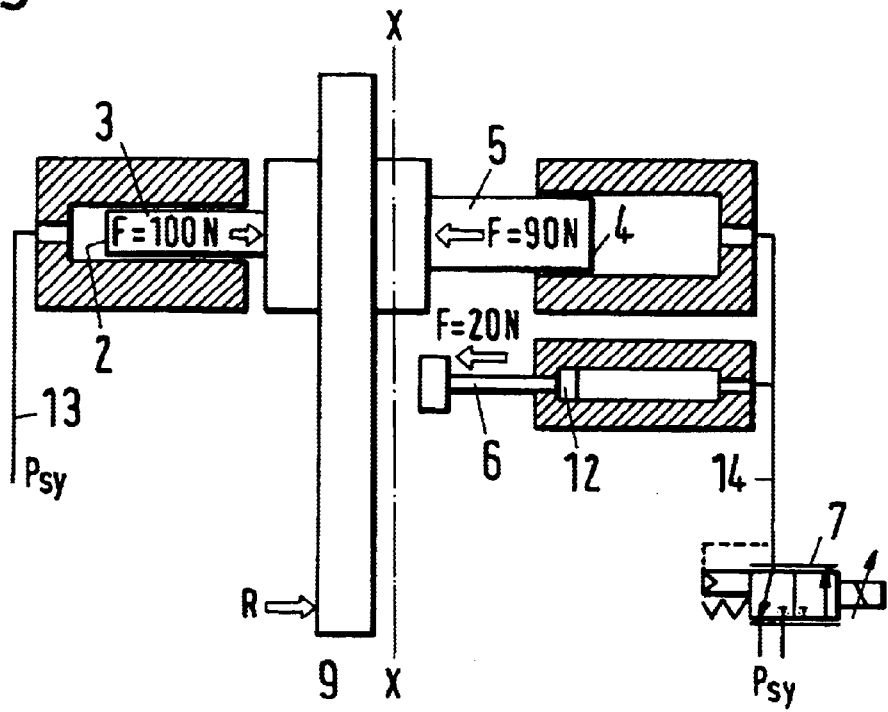
FIG. 6 a schematic view of a gear actuator according to a second embodiment of the present invention.

FIG. 6 illustrates a gear actuator according to a second embodiment of the present invention. Same or functionally equivalent parts are designated with the same reference numerals as in the first embodiment.

As shown in FIG. 6, in the gear actuator according to the second embodiment the second piston 5 and the auxiliary piston 6 are connected by a line 14 with the pressure control valve 7. Accordingly, the system pressure Psy is controlled for the second piston 5 as well as for the auxiliary piston 6 by the pressure control valve 7. On the other hand, the uncontrolled system pressure Psy is present at the first piston 3.

In the embodiment according to FIG. 6, the first piston 3 relative to the second piston 5 has a surface area ratio of 5:9. Moreover, the first piston 3 relative to the auxiliary piston 6 has a surface area ratio of 5:2. When the pressure Psy at the first piston 3 is twice that of the pressure for the second piston 5 and for the auxiliary piston 6 controlled by the control valves 7 in the line 14, the selector shaft 9 moves away from the position illustrated in FIG. 6 in the direction of the arrow R because the force F of the first piston of 100 N is greater than the force of the second piston of 90 N. However, the selector shaft 9 will move only into the neutral position X—X because here the auxiliary piston 6 is positioned in its extended position and in this position an equilibrium of forces is present because the auxiliary piston 6 rests against the stop 12. The auxiliary piston 6 acts thus as a stop for the selector shaft so that the selector shaft is positioned in the neutral position. For a defined pressure, the selector shaft 9 can thus be controlled by means of the control characteristic of the pressure control valves 7 and can be moved without sensor means into the neutral position. This means that finding the neutral position of the selector shaft does not require a sensor. Should an additional sensor for determining the neutral position be present for safety reasons, the gear actuator according to the invention still allows finding the neutral position when this sensor fails.

The forces indicated in FIG. 6 represent only exemplary values. In an AMT application, the working piston surfaces 2 and 4 and the piston surface of the auxiliary piston 6 are to be dimensioned according to the engagement and disengagement forces of the transmission.

Figure 7:
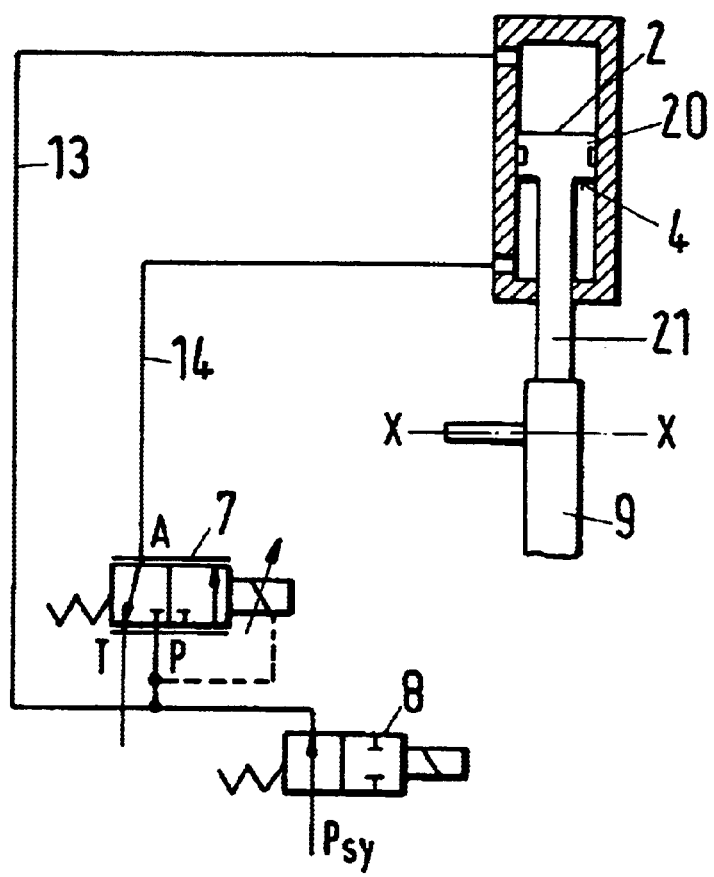
FIG. 7 a schematic view of a gear actuator according to a third embodiment of the present invention.
Figure 8:
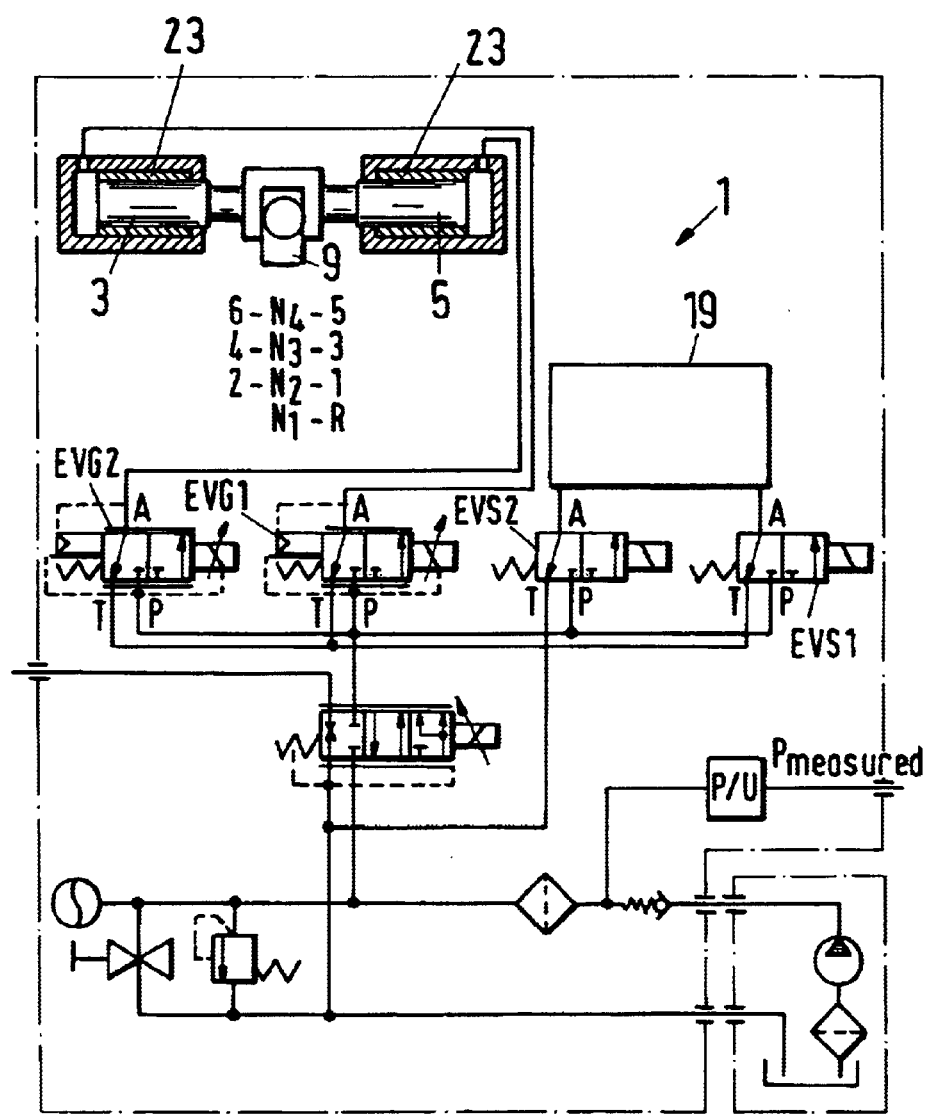
FIG. 8 a view of a gear actuator according to the prior art.

In FIG. 7 a gear actuator according to a third embodiment of the present invention is illustrated. Same or functionally equivalent parts are designated with the same reference numerals as in the first and second embodiments.

As illustrated in FIG. 7, in contrast to the above described embodiments, instead of first and second pistons a common double-action piston 20 is provided. The piston 20 has a first working piston surface 2 and a second working piston surface 4. The second working piston surface 4 is only half the size of the first working piston surface 2.

The piston 20 is connected via connecting rod 21 fixedly with the selector shaft 9 in order to define the movement of the selector shaft 9 as a function of the pressure controlled by the pressure control valve 7.

The first working piston surface 2 is loaded by a line 13 directly with the system pressure Psy while the second working piston surface 4 is loaded via a line 14 with the system pressure controlled by the pressure control valve 7. By employing a double-action piston, the gear actuator according to the third embodiment of the invention can be further simplified and can have a reduced weight. In FIG. 7, the auxiliary piston for determining the neutral position is not illustrated. Otherwise, the operating principle of the gear actuator corresponds to that of the above described embodiments so that reference can be had to the description provided in connection therewith.

In summarizing the above, the present invention relates to a gear actuator for engaging and disengaging gears in an automatic manual transmission. The gear actuator comprises a first working piston surface 2, a second working piston surface 4, an auxiliary piston 6, and a pressure control valve 7. A pressure control valve 7 controls the pressure for the second working piston surface 4. The first working piston surface 2 and the pressure control valve 7 are supplied with a system pressure Psy, and the first working piston surface 2 and the pressure control valve 7 can be decoupled by means of a shut-off valve 8 from the system pressure.

The above description of the embodiments according to the present invention serves only for illustrative purposes and not for the purpose of limiting the invention. In the context of the invention, different changes and modifications are possible without leaving the scope of the invention or its equivalents.

What is claimed is:

1. A gear actuator for engaging and disengaging gears in an automatic manual transmission, the gear actuator comprising:

a single working piston or two working pistons provided with a first working piston surface and a second working piston surface;

an auxiliary piston;

a pressure control valve configured to control a pressure supplied to the second working piston surface;

a shut-off valve;

wherein the first working piston surface and the pressure valve are supplied with a system pressure of a hydraulic system; and wherein the first working piston surface and the pressure control valve are configured to be decoupled from the system pressure of the hydraulic system by the shut-off valve;

wherein the pressure control valve is configured to control the system pressure of the hydraulic system to provide a controlled system pressure in a first range, a second range, and a third range, wherein the controlled system pressure in the first range causes a first gear to engage in a gutter of the transmission, wherein the controlled system pressure in the second range determines a neutral position of the transmission, and wherein the controlled system pressure in the third range causes a second gear to engage in the gutter;

wherein in the first range the controlled system pressure is controlled to be 0% to 40% of the system pressure of the hydraulic system.

2. The gear actuator according to claim 1, wherein in the second range the controlled system pressure is controlled to be 41% to 59% of the system pressure of the hydraulic system.

3. The gear actuator according to claim 1, wherein in the third range the controlled system pressure is controlled to be 60% to 100% of the system pressure of the hydraulic system.

* * * * *